(12) United States Patent
Geschwandner et al.

(10) Patent No.: US 9,306,361 B2
(45) Date of Patent: Apr. 5, 2016

(54) GAS LASERS INCLUDING HEAT EXCHANGERS

(71) Applicant: TRUMPF Laser- und Systemtechnik GmbH, Ditzingen (DE)

(72) Inventors: Mark Geschwandner, Korntal-Muenchingen (DE); Matthias Breisacher, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 1 day.

(21) Appl. No.: 14/091,896

(22) Filed: Nov. 27, 2013

(65) Prior Publication Data

US 2014/0092928 A1 Apr. 3, 2014
US 2014/0355633 A9 Dec. 4, 2014

Related U.S. Application Data

(63) Continuation of application No. PCT/EP2012/060027, filed on May 29, 2012.

(30) Foreign Application Priority Data

Jun. 1, 2011 (DE) .......................... 10 2011 076 871

(51) Int. Cl.
*H01S 3/04* (2006.01)
*H01S 3/041* (2006.01)
(Continued)

(52) U.S. Cl.
CPC .............. *H01S 3/041* (2013.01); *F28D 7/1623* (2013.01); *F28F 1/24* (2013.01); *F28F 21/083* (2013.01);
(Continued)

(58) Field of Classification Search
CPC ........ F28D 7/1623; F28F 1/24; F28F 21/083; F28F 21/084; F28F 2220/00; F28F 19/06; F28F 2280/02; H01S 3/036; H01S 3/041; H01S 3/0835; H01S 3/2232; H01S 3/0971
USPC .............................. 372/55, 58, 61, 62, 63, 65
See application file for complete search history.

(56) References Cited

U.S. PATENT DOCUMENTS 4,760,581 A 7/1988 Hoag
6,665,327 B1 * 12/2003 von Borstel et al. ............ 372/61
(Continued)

FOREIGN PATENT DOCUMENTS

DE 102007030548 A1 1/2009
DE 202010007533 U1 * 8/2010 ................ F28F 9/02
(Continued)

OTHER PUBLICATIONS

Notification of transmittal of translation of the International Preliminary Report on Patentability and Written Opinion from corresponding PCT Application No. PCT/EP2012/060027, mailed Dec. 12, 2013, 12 pages.
International Search Report from corresponding PCT Application No. PCT/EP2012/060027, mailed Aug. 3, 2012, 4 pages.

*Primary Examiner* — Yuanda Zhang
(74) *Attorney, Agent, or Firm* — Fish & Richardson P.C.

(57) ABSTRACT

A gas laser includes a fan for producing a flow of a laser gas and a heat exchanger including multiple heat exchanger pipes. The heat exchanger further includes two end plates to which the multiple heat exchanger pipes are secured at the opposing ends thereof. The two end plates include openings for supplying a heat exchanger fluid to the multiple heat exchanger pipes. The multiple heat exchanger pipes extend substantially transversely relative to a flow direction of the flow of laser gas.

17 Claims, 2 Drawing Sheets

(51) Int. Cl.
   *F28D 7/16*   (2006.01)
   *F28F 1/24*   (2006.01)
   *H01S 3/036*   (2006.01)
   *F28F 21/08*   (2006.01)
   H01S 3/083   (2006.01)
   H01S 3/0971   (2006.01)
   H01S 3/223   (2006.01)
   *F28F 19/06*   (2006.01)

(52) U.S. Cl.
   CPC .............. *F28F 21/084* (2013.01); *H01S 3/036* (2013.01); *F28F 19/06* (2013.01); *F28F 2220/00* (2013.01); *F28F 2280/02* (2013.01); *H01S 3/0835* (2013.01); *H01S 3/0971* (2013.01); *H01S 3/2232* (2013.01)

(56) References Cited

U.S. PATENT DOCUMENTS

2006/0090888 A1*   5/2006   Huang et al. ............... 165/174
2011/0024401 A1   2/2011   Wahl

FOREIGN PATENT DOCUMENTS

| DE | 102008013816 B4 | 9/2010 |
| DE | 202010007533 U1 | 9/2010 |
| EP | 0622601 A1 | 11/1994 |
| JP | 08306989 | 11/1996 |
| JP | 2001284686 A | 10/2001 |
| JP | 2006153398 A | 6/2006 |
| WO | WO2011150920 A3 | 5/2012 |

* cited by examiner

GAS LASERS INCLUDING HEAT EXCHANGERS

CROSS REFERENCE TO RELATED APPLICATIONS

This application is a continuation of and claims priority under 35 U.S.C. §120 to PCT Application No. PCT/EP2012/060027 filed on May 29, 2012, which claims priority to German Application No. 10 2011 076 817.8, filed on Jun. 1, 2011. The contents of both of these priority applications are hereby incorporated by reference in their entirety.

TECHNICAL FIELD

The present disclosure relates to gas lasers that include fans for producing gas flows and heat exchangers including multiple heat exchanger pipes.

BACKGROUND

A heat exchanger can be included in a gas laser to cool gas that forms a gain medium of the gas laser. Such a heat exchanger may include multiple heat exchanger pipes which have cooling ribs which are produced by rolling of a heat radiation pipe, into which an inner pipe is introduced. A large number of such heat exchanger pipes can be connected to each other to form a heat exchanger which serves to cool a laser gas. Some gas lasers have heat exchangers which have a helical cooling coil and which are arranged in a discharge housing or a supply housing in order to discharge or supply the laser gas to a radial fan. However, the efficiency (e.g., quantified as a cooling power per $cm^3$) of helical cooling coils is comparatively low. Use of such cooling coils may also lead to undesirable fluctuations or pressure jumps of the laser gas to be cooled.

SUMMARY

The present disclosure relates to gas lasers including heat exchangers that have a compact structural form and that exhibit efficient heat exchange.

In some embodiments of a gas laser, a heat exchanger has two end plates to which the heat exchanger pipes are secured with the opposing ends thereof (in a fluid tight manner). In the end plates are formed openings for supplying a heat exchanger fluid to the heat exchanger pipes.

Owing to the fixing of the heat exchanger pipes to the two end plates, the heat exchanger may be produced in a compact structural form, with the end plates ensuring a high level of stability. The distribution or the supply of the heat exchanger pipes with a heat exchanger fluid (in the applications involved here, generally water) can be carried out via the openings formed in the end plates. Such a cartridge-like heat exchanger can be fitted in a corresponding housing of the gas laser in a simple manner and also be exchanged if modifications have to be carried out on the heat exchanger. The end plates may be produced from metal (for example, from stainless steel).

The heat exchanger is orientated with respect to the flow direction of the gas flow of the laser gas in such a manner that the heat exchanger pipes extend substantially transversely relative to the flow direction of the gas flow. The fan may be a radial fan which is arranged at a central location and from which multiple supply pipes and discharge pipes extend into the region of the laser resonator, which is typically folded in a square manner.

In an embodiment, there are formed in the end plates channels for connecting at least two openings, which are associated with different heat exchanger pipes. Multiple heat exchanger pipes can be connected to each other by the channels in the end plates and, in this manner, the distribution of the heat exchanger fluid can be directed in an appropriate manner. The flow path of the heat exchanger fluid may be selected in such a manner that only a single supply and a single discharge for the heat exchanger fluid may be provided in the heat exchanger. Alternatively, it is also possible to carry out the distribution of the heat exchanger fluid in such a manner that multiple separate heat exchanger circuits are arranged in the heat exchanger by multiple groups of heat exchanger pipes which are separated in a fluid-tight manner, with each heat exchanger circuit being provided with a separate supply and discharge.

The channels may be formed by a method involving material removal, for example, by means of milling, at the end plates which may, for example, be constructed in an integral manner. Alternatively, other (e.g., shaping) methods, for example, so-called hydroforming, may also be used to form the channels. Alternatively, it is also possible to use end plates which have multiple layers which are arranged one on top of the other, with the channels being formed as recesses in one or more of the layers. The channels and the connection thereof to form the heat exchanger pipes can be configured freely in terms of their arrangement and consequently allow multi-stage operation, (that is to say, multiple separate heat circuits which can also be operated at the same time). In such embodiments, the heat of the laser gas to be discharged is transferred to different water circuits which are typically geometrically directly sequential (for example, a hot and a cold water circuit). This modular structure provides a high level of flexibility, which enables different variant constructions to be produced within a short period of time in the event of changed requirements or ambient conditions.

In some embodiments, there is formed at least one channel for connecting precisely two (typically adjacent) heat exchanger pipes. Owing to the use of such channels, a serial connection may be produced between multiple heat exchanger pipes. In this manner, the heat exchanger fluid in a first heat exchanger pipe flows from the first end plate to the second end plate and, in a second heat exchanger pipe which is connected to the first heat exchanger pipe via the channel, flows from the second end plate back to the first end plate.

In certain embodiments, the end plates have covers for closing the channels in a fluid-tight manner. If the end plates and the covers are formed from a metal material (for example, from stainless steel), the fluid-tight closing of the channels can be carried out, for example, by means of welding.

In some embodiments, the heat exchanger pipes are orientated parallel to each other and typically extend substantially perpendicularly to a (main) flow direction of the laser gas. In this manner, the efficiency of the heat transmission between the laser gas and the heat exchanger fluid can be increased.

In certain embodiments, the heat exchanger pipes are positioned in a matrix-like arrangement (that is to say, in multiple rows and columns). Owing to the regular arrangement, pressure peaks and fluctuations of the laser gas can be kept low. The number of rows of heat exchanger pipes which are used in the heat exchanger is typically eight or more, and the number of heat exchanger pipes in a row is generally approximately three or more. Such an arrangement ensures, even with a comparatively low pressure of the laser gas (for example, approximately 150 hPa), a sufficiently large heat exchange.

In some embodiments, the heat exchanger pipes of adjacent rows are arranged so as to be offset relative to each other. This arrangement, in the event of a flow direction of the laser gas extending substantially perpendicularly relative to the heat exchanger pipes, may lead to the formation of a turbulent gas flow, which significantly increases the efficiency of the heat transmission, without the pressure losses of the laser gas becoming too great. Such an arrangement consequently provides an optimal compromise between the efficiency of the heat transmission and the pressure losses of the laser gas. In particular, in such an arrangement, a high heat exchange can be achieved even at a low pressure of the laser gas (for example, approximately 150 hPa).

The heat exchanger pipes advantageously have an inner pipe and multiple cooling ribs. The heat exchanger fluid is guided through the inner pipe. The cooling ribs may be constructed on the inner pipe, for example, by rolling (that is to say, the inner pipe is surrounded by an outer pipe, on which the cooling ribs are formed). During the rolling operation, there is pushed over the inner pipe an outer pipe which is not yet provided with ribs. Owing to cutting rollers which run into each other, the cooling ribs are cut or formed from the smooth outer pipe. The very high shaping forces during the rolling of the pipes ensure a very secure fit and consequently very good heat transmission between the two materials.

It is advantageous for the inner pipe and the cooling ribs or the outer pipe to be produced from different materials (e.g., metal materials) when the heat exchanger pipe is a bimetal pipe. For example, the inner pipe may be made of stainless steel in order to prevent corrosion of the inner pipe by the heat exchanger fluid which is guided therein. The cooling ribs or the outer pipe may in contrast be made of another metal material (for example, from aluminum,) that has a high level of thermal conductivity. Since the material of the cooling ribs does not come into contact with the heat exchanger fluid, it is not necessary for the cooling ribs to have a high level of corrosion resistance.

In certain embodiments, the heat exchanger includes at least two connection pieces or openings for supplying and discharging a heat exchanger fluid. The modular heat exchanger allows all the heat exchanger pipes to be used in a single heat exchanger circuit or alternatively allows multiple groups of heat exchanger pipes to be formed, which are each associated with different heat exchanger circuits. For each of these circuits, there may be provided on the heat exchanger, more specifically on the end plates, a separate pair of connection pieces. Of course, the covers of the channels may optionally be provided with a connection for supplying or discharging the heat exchanger fluid in order to increase the flexibility when the heat exchanger is used. Alternatively, the supply or discharge at an end plate may also be directly connected to the opening of a heat exchanger pipe.

In some embodiments, the gas laser additionally includes a housing for receiving the heat exchanger. The housing may, for example, be a supply housing or a discharge housing for the laser gas to or from the laser resonator, respectively. The cartridge-like heat exchanger may be pushed into such a housing, which has a recess or an opening for this purpose. The opening may be constructed in a continuous manner so that the end plates form the side faces of the housing.

The cartridge-like heat exchanger received in the housing is connected to the housing in a gas-tight manner, more specifically in a vacuum-tight manner, in order to encapsulate the flow of the laser gas. In particular, all the interfaces of the housing with the heat exchanger received therein are intended to be constructed in a helium-tight or vacuum-tight manner. For example, the sealing at interfaces between the laser gas and the ambient air (for example, between the cartridge-like heat exchanger insert and the housing) should have a leakage rate of less than $1 \times 10^{-8}$ mbar liter/sec., even with a comparatively low pressure of the laser gas of (for example, approximately 150 hPa). The sealing at interfaces between the laser gas and the cooling water at the heat exchanger should also have a leakage rate of less than $1 \times 10^{-12}$ mbar liter/sec. at high pressures of the cooling fluid of up to 10 bar.

One of the end plates may protrude from the edge of the housing beyond the opening in order to fix the heat exchanger which is inserted into the housing to a peripheral housing edge (that is to say, this end plate has a larger surface than the second end plate which is inserted into the opening). The larger end plate is fixed to the peripheral housing edge in a gas or vacuum-tight manner and acts at the same time as a seal in order to produce a compact structure. A vacuum-tight connection may, for example, be ensured by screwing the end plate to the housing edge. In particular, a peripheral seal may be fitted between the housing edge and the end plate, with the peripheral seal preferably being located further inwards than the securing locations during the screwing operation. In particular, there may be provided at the housing edge (or on the end plate) a peripheral recess for receiving the seal (for example, in the form of an O ring). In order to produce the sealing effect, the seal may be clamped between the end plate and the housing edge during the screwing operation. Alternatively, the end plates may be constructed in a symmetrical manner (that is to say, the surfaces of the end plates may be of the same size).

Other aspects, features, and advantages will be apparent from the description, the claims, and the drawings. The above-mentioned features and those set out below may also be used individually or together in any combination. The embodiments shown and described are not intended to be a conclusive listing but instead are of an exemplary nature.

DETAILED DESCRIPTION

Figure 1:
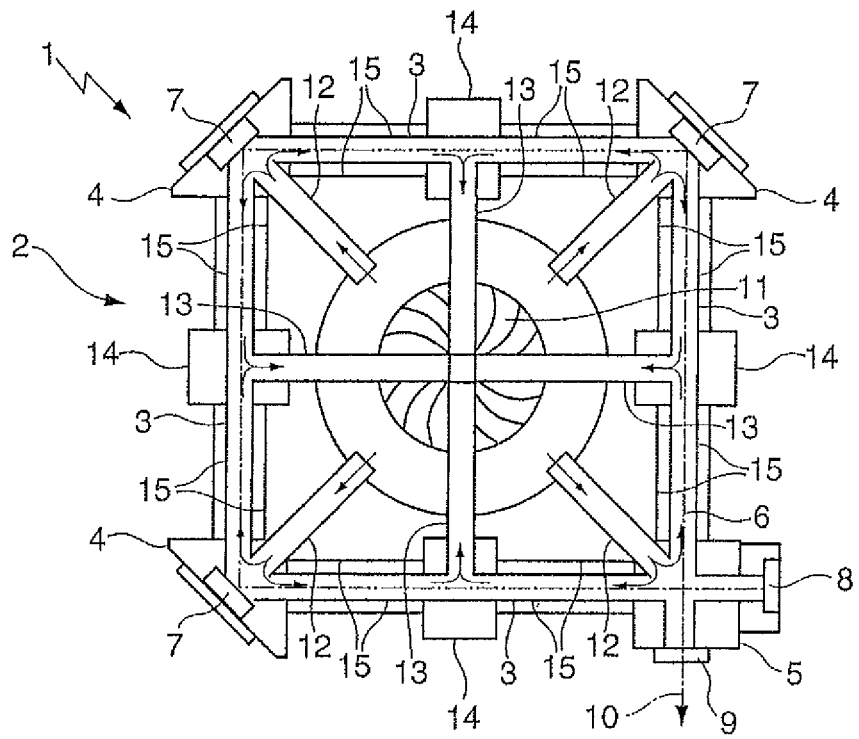
FIG. 1 is a cross-sectional top view of a $CO_2$ gas laser with a folded laser resonator.
Figure 2:
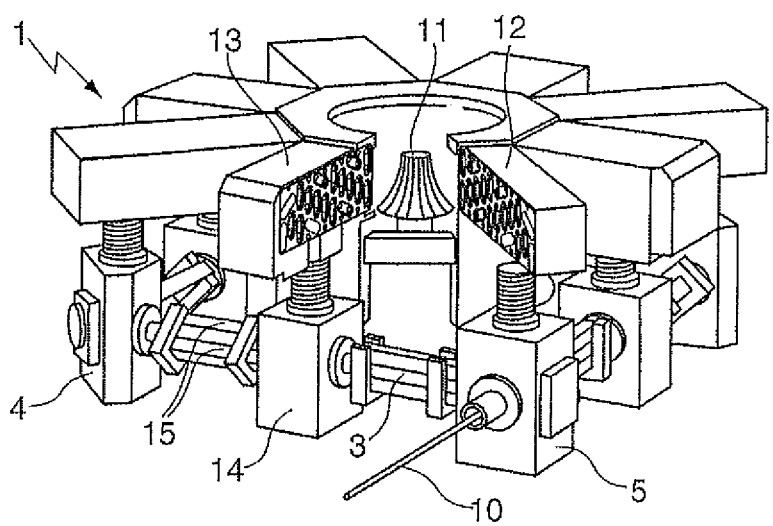
FIG. 2 is a perspective view of the $CO_2$ gas laser of FIG. 1.

The $CO_2$ gas laser 1 shown in FIG. 1 and FIG. 2 has a laser resonator 2 which is folded in a square manner. The laser resonator 2 has four mutually adjacent laser discharge pipes 3 which are connected to each other by corner housings 4, 5. A laser beam 6 which extends in the direction of the axes of the laser discharge pipes 3 is illustrated with dot-dash lines. Redirection mirrors 7 in the corner housings 4 serve to redirect the laser beam 6 by 90° in each case. A rear mirror 8 and a partially transmissive output coupling mirror 9 are arranged in one of the corner housings 5. The rear mirror 8 is constructed in a highly reflective manner and reflects the laser beam 6 by 180° so that the laser beam passes through the laser discharge pipes 3 again in the opposing direction.

A portion of the laser beam 6 passes out of the laser resonator 2 through the partially transmissive output coupling mirror 9, and the other portion remains in the laser resonator 2 and passes through the laser discharge pipes 3 again. The portion of the laser beam 6 passing out of the laser resonator 2 through the output coupling mirror 9 is designated 10 in FIG. 1.

In the center of the folded laser resonator 2, there is arranged as a pressure source for laser gas a radial fan 11 which is connected to the corner housings 4, 5 by supply housings 12 for laser gas. Centrally between the corner housings 4, 5 there are arranged additional housings 14 of the laser resonator 2 which are connected to discharge housings 13 which serve to discharge the laser gas from the laser resonator 2 and return it to the radial fan 11. The flow direction of the laser gas inside the laser discharge pipes 3 and in the supply and discharge housings 12, 13 is indicated in FIG. 1 by arrows.

The excitation of the laser gas is carried out by electrodes 15 which are arranged adjacent to the laser discharge pipes 3 and which are connected to a high frequency (HF) generator (not shown). HF generators that may be used include, for example, a pipe generator having an excitation frequency of 13.56 MHz or 27.12 MHz.

Figure 3:
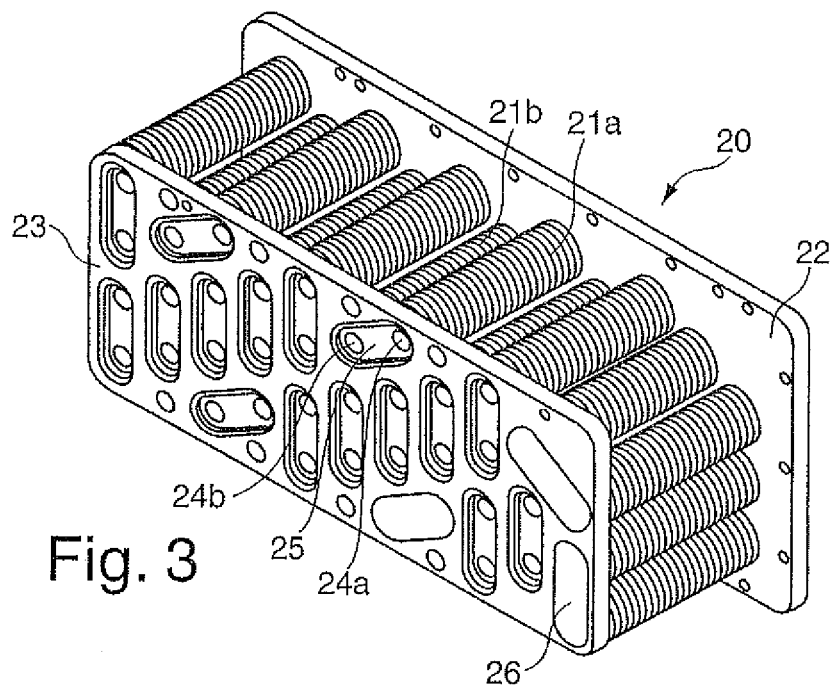
FIG. 3 is a perspective view of a heat exchanger cartridge for the $CO_2$ gas laser of FIG. 1 and FIG. 2.

As shown in FIG. 2, there are introduced both in the supply housings 12 and in the discharge housings 13 of the gas laser 1 a cartridge-like heat exchanger 20 which is illustrated in detail in FIG. 3. The heat exchanger 20 has multiple heat exchanger pipes 21a, 21b which are arranged between two rectangular end plates 22, 23 and which are welded at the opposing ends thereof to the end plates 22, 23. In the end plates 22, 23 there are formed openings 24a, 24b which enable a heat exchanger fluid to be introduced into the inner side of each heat exchanger pipe 21a, 21b (e.g., water being used as the heat exchanger fluid in the present example).

FIG. 3 also shows cooling channels 25 which in the example shown each connect two adjacent heat exchanger pipes 21a, 21b to each other in order to enable a serial flow through of all the heat exchanger pipes 21a, 21b of the heat exchanger. The channels 25 are sealed by respective plate-like covers 26 in a fluid-tight manner with respect to the environment. In the present example, the end plates 22, 23 are formed of stainless steel (e.g., V4A steel, 1.4571) and the covers 26 are also produced from this material so that the fluid-tight sealing of the channels 25 can be carried out by welding. Only a small number of covers 26 are shown in FIG. 2 and FIG. 3. However, during operation of the heat exchanger 20, all of the channels 25 are typically closed by covers 26.

In the example shown in FIG. 3, the cooling channels 25 are milled as recesses in the end plates 22, 23, but the cooling channels 25 may also be produced in a different manner (for example, via hydroforming). It is also possible to construct the end plates 22, 23, not integrally as shown in FIG. 3, but instead in several layers, with the cooling channels 25 being constructed as recesses in individual layers.

Owing to the cooling channels 25, the distribution of the cooling medium (e.g., water) can be carried out inside the end plates 22, 23 so that the heat exchanger 20 can be produced in a compact construction. In the present example, a first connection piece 27a (see FIG. 4) on the first end plate 22 serves to supply water to the heat exchanger 20, and a second connection piece 27b serves to discharge the water heated by the laser gas during the heat exchange from the heat exchanger 20. The connection pieces 27a, 27b are each directly connected to a respective opening of a heat exchanger pipe. However, the connection pieces 27a, 27b can also be fitted in a cover 26 of the end plate 22, which is not illustrated on the end plate 22 in FIG. 4 for simplicity. This last arrangement is particularly advantageous when multiple rib pipes (for example, entire rows of rib pipes) are intended to be supplied with the cooling medium in parallel.

Figure 4:
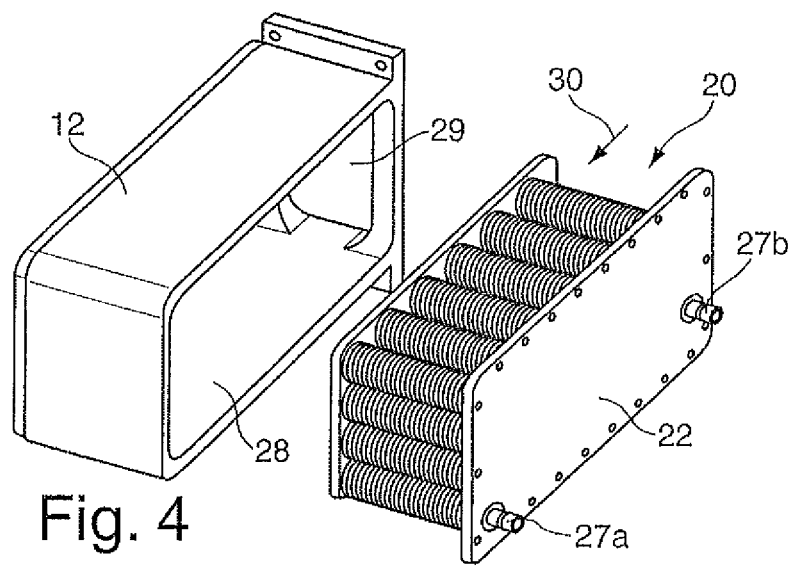
FIG. 4 is a perspective view of the heat exchanger cartridge of FIG. 3 and an associated housing.

In the example shown in FIG. 3 and FIG. 4, the cooling medium passes through all of the heat exchanger pipes 21a, 21b, one after the other (in series) starting from the first connection piece 27a. Alternatively, additional pairs of connection pieces may also be provided on the heat exchanger 20 in order to form multiple independent heat circuits (for example, a heating circuit and an independent cooling circuit). To this end, the covers 26 may be modified in an appropriate manner. For example, the covers 26 may be provided with connection pieces or individual covers 26 may be constructed in such a manner that they separate the openings which belong to a channel 25 and consequently separate the connection of heat exchanger pipes 21a, 21b which belong to different heat circuits.

As shown in FIG. 4, the heat exchanger 20 is inserted into a supply housing 12 (also shown in FIG. 2). The heat exchanger 20 can also be inserted into a discharge housing 13 since both housings 12, 13 are substantially of the same construction type. The supply housing 12 has a through-opening 28 in order to be able to laterally insert the heat exchanger 20 into the housing 12. A first end plate 22 is constructed to be larger than the through-opening 28 so that the heat exchanger 20 which is inserted or recessed into the housing 12 can be fixed to the housing 12 at the peripheral edge of the end plate 22. The fixing may, for example, be carried out by screwing fasteners, for example, through the openings shown in FIG. 4 along the edges of the end plate 22. Between the peripheral edge of the end plate 22 and the housing 12, a peripheral seal (not shown) may be provided in order to connect the heat exchanger 20 to the housing 12 in a gas-tight manner (more specifically, in a vacuum-tight manner). The seal is preferably arranged between the through-opening 28 and the openings which are provided at the edges of the end plate 22 for the screwing operation. At an end face of the supply housing 12 there is formed a gas inlet opening 29 through which the laser gas flows from the radial fan 11 into the heat exchanger 20, with a flow direction 30 of the laser gas indicated by an arrow in FIG. 4 extending parallel to the end plates 22, 23.

Since the heat exchanger pipes 21a, 21b are orientated in a parallel manner and extend at a right angle relative to the end plates 22, 23, the laser gas strikes the heat exchanger pipes 21a, 21b substantially perpendicularly relative to the longitudinal pipe direction. As shown in FIG. 3, the heat exchanger pipes 21a, 21b are arranged in rows which are offset relative to each other, there being arranged in a row in each case four heat exchanger pipes 21a and, in an adjacent row, five heat exchanger pipes 21b. The heat exchanger pipes 21a, 21b are so close to each other that a turbulent gas flow is produced. In this manner, particularly effective heat exchange can be achieved between the laser gas and the water which flows through the heat exchanger pipes 21a, 21b without an excessively great pressure loss of the laser gas occurring in this instance. The discharge of the laser gas to the laser resonator 2 is carried out through an opening (not illustrated in FIG. 4) at the lower side of the supply housing 12.

Figure 5:
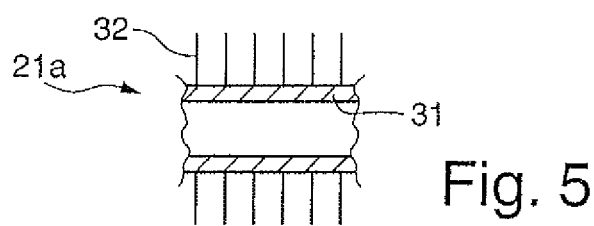
FIG. 5 is a cross-sectional view of a heat exchanger pipe of the heat exchanger cartridge of FIG. 3.

FIG. 5 shows the structure of a heat exchanger pipe 21 a, which is a bimetal pipe. The heat exchanger pipe 21 a has an inner pipe 31 of stainless steel and multiple cooling ribs 32 made of aluminum which are rolled onto the inner pipe 31 (that is to say, the cooling ribs 32 are formed as an outer pipe). For rolling, there is pushed over the inner pipe 31 an outer pipe of aluminum which is not yet provided with ribs. Via cutting rollers which run into each other, the cooling ribs 32 are cut or shaped from the smooth outer pipe. The use of an inner pipe 31 of stainless steel prevents corrosion by the cooling fluid, whilst the cooling ribs 32 of aluminum ensure efficient heat exchange.

In the manner described above, there may be provided a heat exchanger 20 which is optimized in terms of flow technology and has a compact structure. Since individual cooling circuits can be divided by cooling medium connections being fitted to selected cooling channels for distribution of the cooling medium at the end plates, there is further produced a modular construction which can be adapted in a simple and rapid manner to the respective requirements during operation of the gas laser 1.

A number of embodiments of have been described. Nevertheless, it will be understood that various modifications may be made without departing from the spirit and scope of the disclosure. Accordingly, other embodiments are within the scope of the following claims.

The invention claimed is:

1. A gas laser, comprising:
   a fan for producing a flow of laser gas; and
   a heat exchanger including a plurality of heat exchanger pipes and two end plates to which the plurality of heat exchanger pipes are secured at opposing ends thereof,
   wherein the two end plates include supply openings for supplying a heat exchanger fluid to the plurality of heat exchanger pipes, channels for fluidly connecting at least two supply openings that are associated with different heat exchanger pipes of the plurality of heat exchanger pipes, and covers for closing the channels in a fluid-tight manner,
   wherein the channels are formed as recesses in the two end plates, each recess defining a channel opening disposed along a first side of a respective end plate, the first side being disposed opposite a second side of the respective end plate to which the plurality of heat exchanger pipes are secured,
   wherein each cover is configured to close the channel opening defined by a respective recess in a fluid-tight manner, and
   wherein the plurality of heat exchanger pipes extends substantially transversely relative to a flow direction of the flow of laser gas.

2. The gas laser according to claim 1, wherein at least one channel is configured to connect two heat exchanger pipes of the plurality of heat exchanger pipes.

3. The gas laser according to claim 1, wherein the heat exchanger pipes of the plurality of heat exchanger pipes are orientated parallel to each other.

4. The gas laser according to claim 1, wherein heat exchanger pipes of the plurality of heat exchanger pipes are positioned in a matrix-like arrangement.

5. The gas laser according to claim 4, wherein the heat exchanger pipes of adjacent rows of the matrix-like arrangement are arranged offset relative to each other.

6. The gas laser according to claim 1, wherein each heat exchanger pipe of the plurality of heat exchanger pipes includes an inner pipe and a plurality of cooling ribs.

7. The gas laser according to claim 6, wherein the inner pipe and the plurality of cooling ribs are produced from different materials.

8. The gas laser according to claim 7, wherein the different materials comprise metals.

9. The gas laser according to claim 8, wherein the cooling ribs are made of aluminum.

10. The gas laser according to claim 8, wherein the inner pipe is made of stainless steel.

11. The gas laser according to claim 1, further comprising at least two connection pieces for supplying and discharging a heat exchanger fluid.

12. The gas laser according to claim 1, further comprising a housing defining an opening for receiving the heat exchanger.

13. The gas laser according to claim 12, wherein the opening is formed as a through-opening.

14. The gas laser according to claim 12, wherein one of the two end plates protrudes beyond the opening of the housing along a side edge of the housing.

15. The gas laser according to claim 1, wherein at least one channel is closed in a fluid-tight manner by a cover that is configured to separate two openings associated with the at least one channel.

16. The gas laser according to claim 1, wherein each recess defines a circumferential step.

17. A gas laser, comprising:
   a fan for producing a flow of laser gas; and
   a heat exchanger including a plurality of heat exchanger pipes and two end plates to which the plurality of heat exchanger pipes are secured at opposing ends thereof,
   wherein the two end plates include openings for supplying a heat exchanger fluid to the plurality of heat exchanger pipes, channels for fluidly connecting at least two openings that are associated with different heat exchanger pipes of the plurality of heat exchanger pipes, and covers for closing the channels in a fluid-tight manner,
   wherein at least one of the channels is closed in a fluid-tight manner by a cover that is configured to separate two of the openings associated with the at least one of the channels, and
   wherein the plurality of heat exchanger pipes extends substantially transversely relative to a flow direction of the flow of laser gas.

* * * * *

UNITED STATES PATENT AND TRADEMARK OFFICE
CERTIFICATE OF CORRECTION

| | | |
|---|---|---|
| PATENT NO. | : 9,306,361 B2 | Page 1 of 1 |
| APPLICATION NO. | : 14/091896 | |
| DATED | : April 5, 2016 | |
| INVENTOR(S) | : Mark Geschwandner et al. | |

It is certified that error appears in the above-identified patent and that said Letters Patent is hereby corrected as shown below:

IN THE SPECIFICATION

In column 1, line 10, delete "10 2011 076 817.8" and insert --10 2011 076 871.8--.

Signed and Sealed this
Seventh Day of June, 2016

Michelle K. Lee
*Director of the United States Patent and Trademark Office*